United States Patent
Hasegawa et al.

(10) Patent No.: US 9,910,859 B2
(45) Date of Patent: *Mar. 6, 2018

(54) SUPPORT FOR WORM CARTRIDGES REALIZED BY LINEAR TAPE FILE SYSTEM (LTFS)

(71) Applicant: International Business Machines Corporation, Armonk, NY (US)

(72) Inventors: Tohru Hasegawa, Tokyo (JP); Hironobu Nagura, Kanagawa (JP); Kazuhiro Ozeki, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 485 days.

This patent is subject to a terminal disclaimer.

(21) Appl. No.: 14/517,173

(22) Filed: Oct. 17, 2014

(65) Prior Publication Data

US 2015/0127616 A1   May 7, 2015

(30) Foreign Application Priority Data

Nov. 7, 2013 (JP) ................................. 2013-231072

(51) Int. Cl.
*G06F 17/30* (2006.01)
(52) U.S. Cl.
CPC .............................. *G06F 17/30188* (2013.01)
(58) Field of Classification Search
CPC .............................................. G06F 17/30188
USPC ........................................................ 707/822
See application file for complete search history.

(56) References Cited

U.S. PATENT DOCUMENTS

| 9,406,334 B2 * | 8/2016 | Hasegawa ........ G11B 20/00166 |
| 2007/0078890 A1 | 4/2007 | Hsu et al. |
| 2008/0172428 A1 | 7/2008 | Stokes |
| 2011/0238714 A1 | 9/2011 | Hsu |
| 2011/0238716 A1 | 9/2011 | Amir et al. |

(Continued)

FOREIGN PATENT DOCUMENTS

| JP | 02077830 A | 3/1990 |
| JP | 02280243 A | 11/1990 |
| WO | 2013054597 A1 | 4/2013 |

OTHER PUBLICATIONS

Article entitled "Featured Blog: LTFS", by Roychowdhury, dated Jul. 2011.*

(Continued)

*Primary Examiner* — Mahesh Dwivedi
(74) *Attorney, Agent, or Firm* — Scott S. Dobson

(57) ABSTRACT

When a WORM cartridge is formatted for Tape File System (LTFS) in advance, such as prior to shipment, Linear Tape File System Library Edition (LTFS LE) is expanded by software to reduce consumption of the index partition and to support elimination of the appending of unnecessary data. More specifically, instead of recording metadata in the index partition during normal unmounting, the metadata is recorded in separate local storage such as on hard disk drive (HDD), and the index partition is updated only when the cartridge is ejected from the library. In this way, the present invention is able to significantly reduce the frequency of index partition updates. Because an update occurs only when the user intentionally ejects a cartridge, overflow of the index partition before overflow of the data partition can be prevented.

12 Claims, 6 Drawing Sheets

Example of Information Recorded on Tape Cartridge

(56) References Cited

U.S. PATENT DOCUMENTS

| | | | |
|---|---|---|---|
| 2011/0238906 A1* | 9/2011 | Amir | G06F 3/0611 711/111 |
| 2012/0179868 A1* | 7/2012 | Haustein | G06F 12/0253 711/111 |
| 2012/0254174 A1* | 10/2012 | Mitra | G06F 17/30159 707/737 |
| 2012/0323934 A1* | 12/2012 | Amir | G06F 17/30091 707/752 |
| 2013/0132663 A1* | 5/2013 | Eleftheriou | G06F 12/0866 711/111 |
| 2015/0120740 A1* | 4/2015 | Abe | G06F 17/30076 707/740 |
| 2015/0120741 A1* | 4/2015 | Abe | G06F 17/30076 707/740 |
| 2016/0098221 A1 | 4/2016 | Klein et al. | |

OTHER PUBLICATIONS

Article entitled "LTO Technology: Portal, Reliable, Cost Effective Data Storage for Business and Entertainment Applications", by Master, dated Apr. 2010.*
Notification of Reasons for Refusal, Patent Application No. 2013-231072, dated Feb. 16, 2016, 6 pages.
Decision to Grant a Patent, Patent Application No. 2013-231072, dated May 16, 2016, 6 pages.
List of IBM Patents or Patent Applications Treated as Related, dated Jan. 18, 2017, pp. 1-2.
Hasegawa et al., "Support for WORM Cartridges Realized by Linear Tape File System (LTFS)", U.S. Appl. No. 15/412,255, filed Jan. 23, 2017.
Hasegawa et al., "Support for WORM Cartridges Realized by Linear Tape File System (LTFS)", Application No. 2013-231072 (Japan), Filed Nov. 7, 2013, 26 pages.

* cited by examiner

Example of Information Recorded on Tape Cartridge

A View of Directories in LTFS LE

The flow when reading and writing occur
such as during a file access request.
① Reading and Writing Occur
② Allocation of Drive
③ Unmounting of Mounted Tape Cartridge
④ Mounting of Tape to Be Accessed Unmounting and Mounting Flow When Reading and Writing Occur

FIG. 4

Table T

| AAA000 | BBB000 | CCC000 | . . . |
|--------|--------|--------|-------|
| 3 | 1 | 2 | . . . |

There are three different access statuses as shown below, and 1, 2 or 3 is recorded in the table T for reference purposes.

1: The cartridge has not been accessed.
2: The cartridge has been accessed, and the index area was not updated after index partition information was copied to the index area.
3: The cartridge has been accessed, and the index area was updated after index partition information was copied to the index area.

Example of Table T

Flow When Access Occurs

Flow During Tape Cartridge Ejection

SUPPORT FOR WORM CARTRIDGES REALIZED BY LINEAR TAPE FILE SYSTEM (LTFS)

TECHNICAL FIELD

The present invention relates to a file system which realizes support for write once read many (WORM) cartridges.

BACKGROUND ART

A new file system called a Linear Tape File System (LTFS) has recently been developed as a new use for tape.

LTFS is software (S/W) which works with hardware (H/W) resources to enable tape to be accessed via the file system interface.

LTFS is realized by storing data on tape cartridges using the LTFS format, which has open specifications, and has been adopted by many companies other than IBM (IBM, the IBM logo, and ibm.com are trademarks or registered trademarks of International Business Machines Corporation, registered in many jurisdictions worldwide).

The LTFS format specifies that the tape built into the tape cartridge be divided into two partitions: an index partition (IP) and a data partition (DP).

Here, metadata such as allocation data for a file is recorded in the index partition, and file data is primarily recorded in the data partition.

The following is background information related to this recording process.

File allocation information is frequently updated, but data is always being appended so that the tape becomes a so-called sequential access device. When data is recorded to a single partition, the allocation information is always recorded at the end.

Because the data at the end has to be read when a tape cartridge is mounted, the mounting process is time consuming.

In LTFS, metadata is overwritten in the beginning portion of the index partition when a tape cartridge is unmounted. As a result, it is always possible to read the metadata from the index partition when a tape is mounted.

More precisely, metadata is also written to the data partition. Even though this takes time, the metadata recorded in the data partition can then be used to restore a mounted tape cartridge when metadata cannot be updated in the index partition due, for example, to a sudden power interruption.

A mechanism is also used to enable storage of a small amount of data in the index partition. Data to be read during the mounting process can then be retrieved rapidly from the index partition by recording the data not only in the data partition but also in the index partition.

FIG. 1 is a diagram showing an example of information recorded on a tape cartridge.

In this example, a separately designated file (File B) and the most recent metadata (Metadata 3) are recorded in the index partition.

Metadata (Metadata 1, Metadata 2, Metadata 3) is also recorded in the data partition along with the actual file data (File A, File B, File, C, File D).

Here, Metadata 1 and Metadata 2 in the data partition is old metadata. Because this information is basically appended to the tape, it is stored without performing any overwriting.

The timing for writing this metadata to the data partition can be established explicitly by an application (for example, by calling FlushFileBuffers( ) which is a standard API in Windows (a trademark of Microsoft Corporation, registered in many jurisdictions worldwide)), can be established based on the timing for closing files in IBM LTFS, or can be established to occur once a predetermined period of time has elapsed.

There are two basic versions of LTFS; LTFS SDE (Linear Tape File System Single Drive Edition) in which a single tape cartridge is inserted into a single tape drive, and LTFS LE (Linear Tape File System Library Edition) in which a plurality of tape cartridges are inserted into a tape library.

In LTFS LE, each LTFS-formatted tape cartridge incorporated into a tape library is expressed as a directory, and the data in each tape cartridge can be accessed as files.

FIG. 2 is a diagram showing a view of directories in LTFS LE as an example in which a tape library including inserted tape cartridges AAA000, BBB000 and CCC000 have been mounted using LTFS LE.

In LTFS LE, the directories (dir1, dir2, dir3) created in tape cartridge CCC000 can be viewed as subdirectories of directory CCC000.

When files are read and updated in a tape cartridge using LTFS LE, a tape cartridge is mounted in a tape drive, and the data is accessed on the tape cartridge.

The number of tape drives incorporated into a tape library is generally smaller than the number of tape cartridges.

Therefore, when a tape cartridge is to be mounted in a tape drive, a tape cartridge in use has to be unmounted if there are no free tape drives, and the tape cartridge to be accessed is mounted.

FIG. 3 is a diagram showing the unmounting and mounting flow when reading and writing occur.

In LTFS LE, the unmounting and mounting operations are concealed from the user, as shown in FIG. 3. If necessary (in accordance with the access request), the tape drives are assigned using an LRU-based algorithm, and tapes are unmounted and mounted in a manner not visible to the user.

When LTFS LE is used, a tape library with a large storage capacity can be used as ordinary disk storage. In this case, the LTFS LE may be shared via a network to create NAS.

Because information is recorded on tape cartridges using the LTFS format, which is an open standard, LTFS LE can be easily used to remove tape cartridges from a tape library and read them using different systems.

When data is moved to a remote site as an emergency precaution or to allow data to be shared at multiple locations, tape cartridges can be removed from a tape library and physically moved without having to establish an expensive broadband network.

Because it is less expensive to use NAS with HDDs, LTFS LE has attracted attention as a means of handling large quantities of data.

When LTFS LE is used as NAS and tape cartridges are removed and used if necessary, it is important to prevent data tampering in the case of removed data cartridges.

One method of preventing data tampering in LTO tape drives and TS1140 tape drives is a mechanism referred to as "WORM (Write Once Read Many)".

When WORM tape cartridges are used (referred to below as "WORM cartridges"), just as with CD-R, data once written cannot be updated or deleted.

Therefore, there is demand for the use of WORM cartridges in LTFS LE as a way of preventing data tampering.

However, LTFS currently does not support WORM cartridges for the following two reasons.

1. Fifth-generation and sixth-generation Linear Tape-Open (LTO) tape drives and TS1140 tape drives supported by LTFS do not support the creation of partitions in WORM cartridges.
2. Even if a tape drive were to support the creation of these partitions, metadata cannot be overwritten in the index partition of a WORM cartridge. It is appended.

Therefore, metadata is frequently appended to the index partition as a sequence of operations is performed such as writing a small number of files, unmounting a cartridge, and writing a small number of files immediately after mounting the cartridge.

Usually, less area is assigned to the index partition than to the data partition in order to be able to store more data. However, when data is frequently appended to the index partition, the capacity of the index partition may be exhausted even though more space is still available in the data partition, and the tape may no longer be updated.

Because the cartridge mounting and unmounting operations are concealed from the user in LTFS LE, mounting and unmounting may occur frequently (simply by repeatedly accessing files in different directories) without the user being aware that this is occurring.

As a result, the index partition may be updated many times without the user being aware of this, and a large amount of the index partition may be consumed.

Therefore, unnecessary appending of data has to be eliminated in order to reduce consumption of capacity in the index partition.

It is not technically difficult to support (1) above, because a WORM cartridge could simply be partitioned in advance, for example, prior to shipment.

Shipment of LTFS-formatted cartridges is being considered for cartridges intended for use in LTFS.

A WORM cartridge may be prepared or formatted by dividing the built-in tape into two WORM partitions, for recording the history of a plurality of files and metadata (including the allocation of one or more recorded files) in the one WORM data partition, and for recording metadata in the other WORM index partition.

A method has been developed for (2) above by applying WORM using only a data partition. This method is explained in detail in an application filed by the present applicant (see Patent Literature 1).

However, a problem remains with applying WORM using only a data partition as disclosed in Patent Literature 1 because there is no index partition for WORM, and tampering with index partition data cannot be detected.

CITED LITERATURE

Patent Literature

Patent Literature 1 PCT Publication WO2013/054597A1
  a. (Applicant Reference No. JP920110094)

SUMMARY OF INVENTION

Technical Problems

It is an object of the present invention to solve the problem that occurs when a WORM cartridge is formatted for LTFS in advance, such as prior to shipment, the cartridge is used in LTFS LE, index partition updates occur frequently without the awareness of the user, and metadata can no longer be written to the index partition even though the data partition is free.

Means of Solving the Problem

In the present invention, when a WORM cartridge is formatted for LTFS in advance such as prior to shipment, LTFS LE is expanded by software to reduce consumption of the index partition and to support elimination of the appending of unnecessary data.

More specifically, instead of recording metadata in the index partition during normal unmounting, the metadata is recorded in separate local storage such as on an HDD, and the index partition is updated only when the cartridge is ejected from the library and is no longer managed by the LTFS LE.

Effect of the Invention

In this way, the present invention is able to significantly reduce the frequency of index partition updates.

Because an update occurs only when the user intentionally ejects a tape cartridge and the cartridge is no longer managed by the LTFS LE, overflow of the index partition before overflow of the data partition can be prevented.

BRIEF EXPLANATION OF THE DRAWINGS

FIG. 4 is a diagram showing an example of a table T of the present invention.

EMBODIMENT OF THE INVENTION

The present invention assumes that a WORM cartridge formatted for LTFS in advance, such as prior to shipment, is being used.

The preparation of WORM cartridges formatted for LTFS in advance, such as prior to shipment, is not currently in practice, but is not technically difficult to realize.

In the present invention, an area is prepared in local storage operated by the LTFS LE, such as the HDD of a PC, for storing the metadata of each cartridge and file data to be written to an index partition.

This area is referred to as the "index area".

An index area may be prepared only for each cartridge managed by the LTFS LE.

A table T indicating the access status of each cartridge by the LTFS LE is also prepared.

FIG. 4 is a diagram showing an example of a table T of the present invention.

There are three different access statuses as shown below, and 1, 2 or 3 is recorded in the table T for reference purposes.
  1: The cartridge has not been accessed.
  2: The cartridge has been accessed, and the index area was not updated after index partition information was copied to the index area.

3: The cartridge has been accessed, and the index area was updated after index partition information was copied to the index area.

The table T may be stored in the memory used by the LTFS LE or may be stored in local non-volatile storage such as on an HDD which can be reused when the LTFS LE process has been ended and is restarted.

Three different statuses (1, 2, 3) can be used in the table T to indicate whether or not a cartridge has been accessed and whether or not the index area has been updated. This is the specifying feature of the present invention.

When the user accesses a file and a cartridge inside a tape library is unmounted from the tape drive, a tape cartridge has to be accessed.

In a conventional LTFS LE, the index partition of a tape cartridge is accessed when the tape cartridge is accessed.

In the present invention, the index area is accessed or not accessed depending on the situation.

Figure 1:
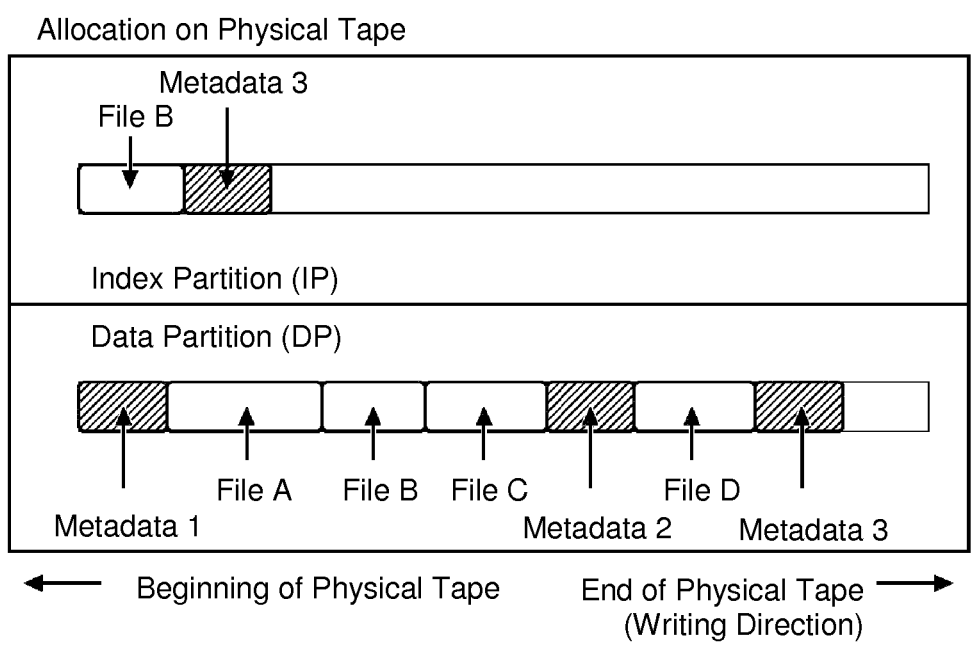
FIG. 1 is a diagram showing an example of information recorded on a tape cartridge.
Figure 2:
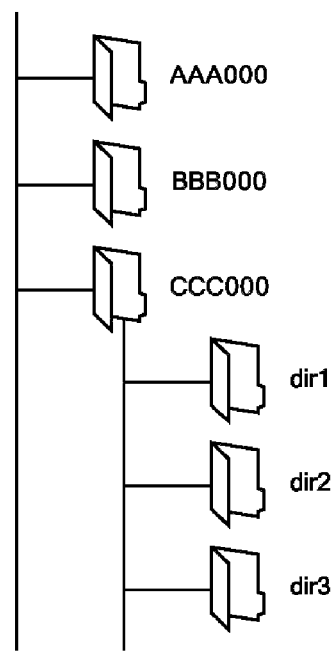
FIG. 2 is a diagram showing a view of directories in LTFS LE as an example in which tape libraries including inserted tape cartridges AAA000, BBB000 and CCC000 have been mounted using LTFS LE.
Figure 3:
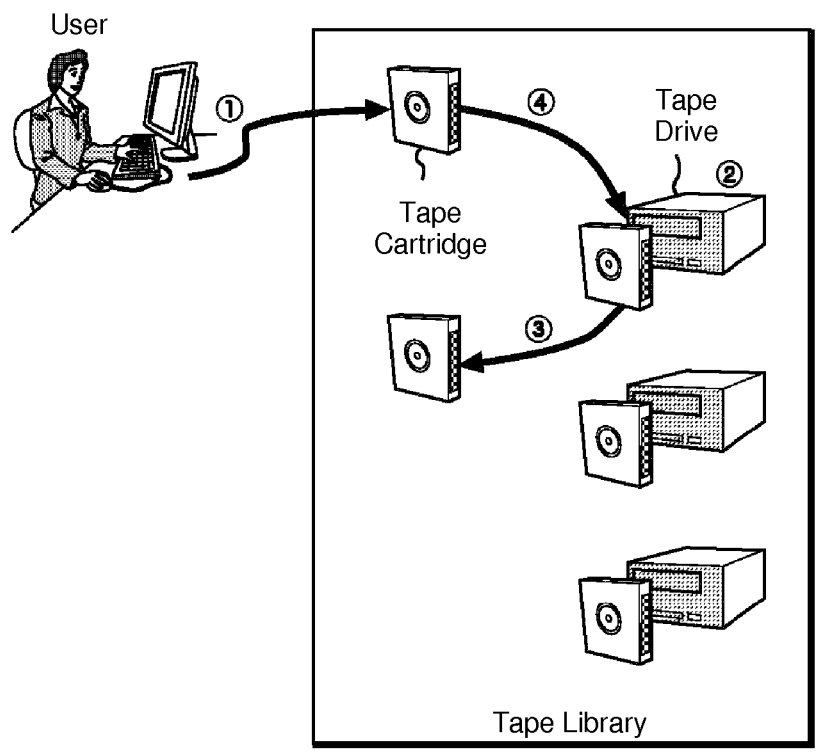
FIG. 3 is a diagram showing the unmounting and mounting flow when reading and writing occur.
Figure 5:
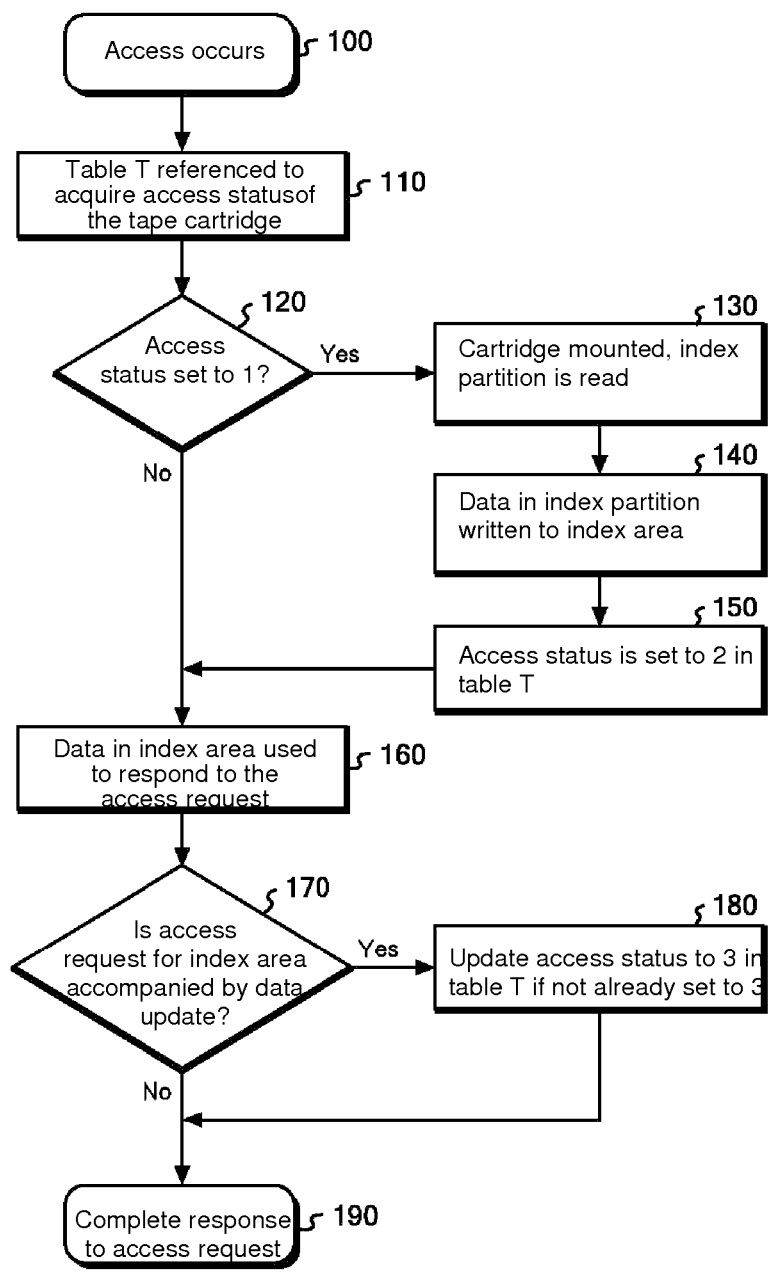
FIG. 5 is a diagram showing the flow when access occurs in the present invention.

FIG. 5 is a diagram showing the flow when access occurs in the present invention.

More specifically, as shown in FIG. 5, the table T is referenced, the index partition information is copied to the index area during initial access to the cartridge, and the index area is then accessed.

In Step 100, the process is initiated to respond to an access request for a file on a tape cartridge mounted in a tape drive.

In Step 110, the table T is referenced to acquire the access status of the tape cartridge.

In Step 120, it is determined whether or not the access status has been set to 1.

If the access status has been set to 1, the tape cartridge is mounted in a tape drive, and metadata recorded in the WORM index partition is read from the mounted tape cartridge in Step 130.

In Step 140, the read metadata is written to the index area of local storage.

In Step 150, the access status is set to 2 in the table T.

In Step 160, the metadata written to the index area is used to respond to the access request for the file (the metadata recorded in the WORM index partition is not used).

In Step 170, it is determined whether or not an access request for the metadata written to the index area is accompanied by a metadata update.

If the access request is accompanied by a metadata update, and the access status in the table T is not 3, the access status is updated to 3 in Step 180.

In Step 190, the response to the access request is completed.

By using a table T in this way to access a tape cartridge, the index area can be accessed after the cartridge has been mounted instead of continuing to access the index partition as in a conventional LTFS LE.

Figure 6:
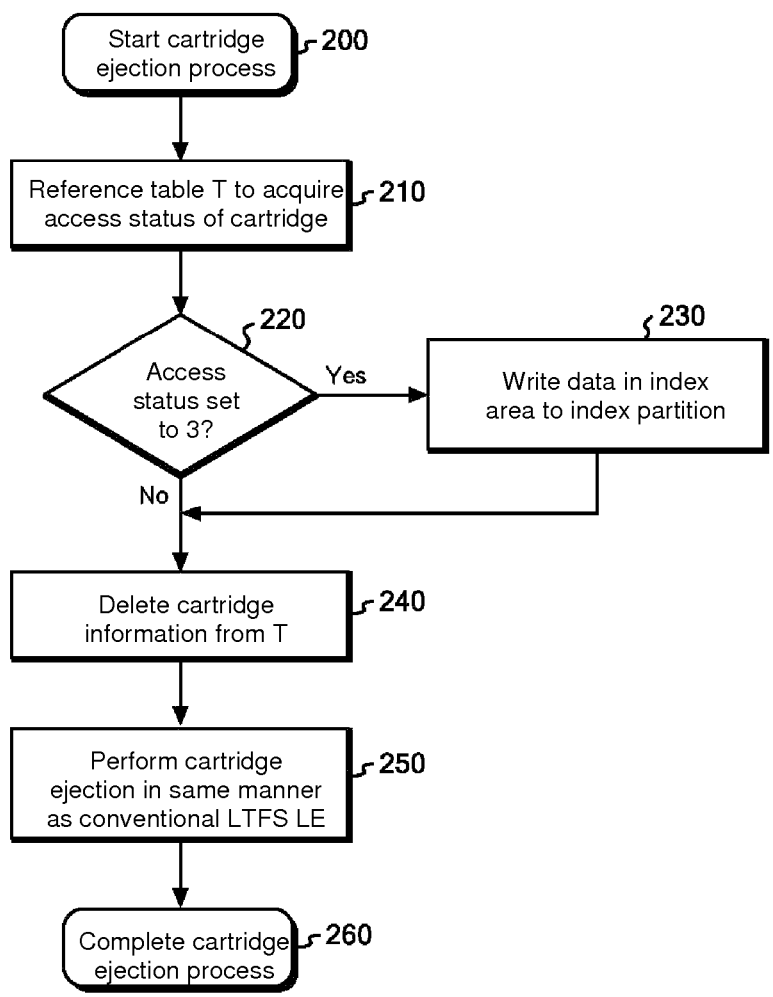
FIG. 6 is a diagram showing the flow when a tape cartridge is ejected in the present invention.

FIG. 6 is a diagram showing the flow when a tape cartridge is ejected in the present invention.

When a tape cartridge is ejected from the LTFS LE, as shown in FIG. 6, the information in the index area is written to the index partition if necessary before the tape cartridge is ejected.

In Step 200, the tape cartridge ejection process is initiated.

In Step 210, the table T is referenced to acquire the access status of the tape cartridge.

In Step 220, it is determined whether the access status has been set to 3.

If the access status has been set to 3, the metadata written to the index area is written to the WORM index partition in Step 230.

If this status has been set, the metadata written to the index area of the local storage is no longer needed and may be deleted.

This operation may be timed to coincide with the cartridge unmounting process when the cartridge is ejected.

In Step 240, the information related to the access status of the tape cartridge is deleted from the table T.

In Step 250, the tape cartridge ejection process may be performed in the same manner as a conventional LTFS LE.

In Step 260, the tape cartridge ejection process is completed.

As explained in FIG. 5 and FIG. 6, the table is set to T (=1) when the table T has not been set to either T (=2) or T (=3).

From FIG. 5 to FIG. 6, the updating, referencing and use of settings in the table T follow the sequential order T (=1), T (=2), T (=3).

Viewed another way, three different statuses (1, 2, 3) are set in the table T in the flow from FIG. 5 to FIG. 6, and whether or not a tape cartridge has been accessed can be identified by groupings 1, 2 and 3, and whether or not the index area of a tape cartridge has been updated can be identified by groupings 2 and 3.

Because the information in the index partition is updated only when a cartridge is ejected from the LTFS LE, the frequency at which the index partition is updated can be significantly reduced.

A cartridge is ejected from the LTFS LE only when the user expressly operates the LTFS LE. Therefore, the index partition is updated only when the user expressly does so.

As a result, the index partition can be prevented from overflowing before the data partition does so.

When a cartridge is inadvertently discharged from the tape library without being expressly ejected, the most recent information may not have been written to the index partition.

However, no data is lost because the latest index information has been written to the data partition. The latest index information can then be recovered through the usual LTFS recovery process.

The present invention may be embodied by a person skilled in the art using technical concepts in other categories. For example, a program could be created to execute in a computer each step in the method of the present invention.

The invention claimed is:

1. A method for eliminating the appending of unnecessary data created when built-in tape in a tape cartridge mounted in a tape drive used in a file system is accessed, to reduce consumption of capacity in a Write Once Read Many (WORM) index partition, the method comprising the steps of:

(a) preparing a tape cartridge by dividing the built-in tape into two WORM partitions, recording the history of a plurality of files and metadata including the allocation of one or more recorded files in one WORM data partition, and metadata in the WORM index partition;

(b) reading metadata recorded in the WORM index partition in response to an access request for a file in a tape cartridge mounted in a tape drive;

(c) writing the read metadata to an index area in local storage;

(d) using the metadata written to the index area to respond to the access request for the file without using the metadata recorded in the WORM index partition;

(e) determining whether or not the access request to metadata written to the index area is accompanied by an update of the metadata; and (f) writing metadata written to the index area to the WORM index partition when it has been determined that the access request is accompanied by an update of the metadata.

2. The method according to claim 1, wherein step (f) is executed when the tape cartridge is unmounted.

3. The method according to claim 1 further comprising the step of:
(g) deleting, after step (f), the metadata written to the index area in the local storage.

4. The method according to claim 3 further comprising the step of:
(h) executing a tape cartridge unmounting process after step (g) has been executed.

5. The method according to claim 1, wherein the file system is the Linear Tape File System (LTFS), and the tape cartridge mounted in the tape drive is a preformatted WORM cartridge.

6. The method according to claim 1, wherein the local storage is storage other than the built-in tape.

7. The method according to claim 6, wherein the local storage is a hard disk drive (HDD).

8. The method according to claim 1, wherein the file system is implemented in the Linear Tape File System Library Edition (LTFS LE) using a plurality of tape cartridges inserted into a tape library.

9. The method according to claim 8, wherein an index area is prepared only for the plurality of tape cartridges incorporated into the Linear Tape File System Library Edition (LTFS LE).

10. The method according to claim 9, wherein a table T indicating the access status of each of the plurality of tape cartridges is provided.

11. The method according to claim 10, wherein three different statuses (1, 2, 3) can be set in the table T to indicate whether or not a tape cartridge has been accessed and whether or not an index area has been updated.

12. The method according to claim 11, wherein the three different statuses (1, 2, 3) are set in the table T, and whether or not a tape cartridge has been accessed can be identified by groupings 1, 2 and 3, and whether or not an index area has been updated can be identified by groupings 2 and 3.

* * * * *